(12) United States Patent
Schromen et al.

(10) Patent No.: US 6,931,826 B1
(45) Date of Patent: Aug. 23, 2005

(54) DUAL DRIVE MATERIAL TURNING MACHINE AND METHOD

(75) Inventors: John P. Schromen, Dyersville, IA (US); Shawn L. Wilson, Delhi, IA (US)

(73) Assignee: Scat Engineering, Inc., Hopkinton, IA (US)

( * ) Notice: Subject to any disclaimer, the term of this patent is extended or adjusted under 35 U.S.C. 154(b) by 0 days.

(21) Appl. No.: 10/656,514

(22) Filed: Sep. 5, 2003

(51) Int. Cl.[7] ..................... A01D 76/00; A01D 78/00; A01D 80/00; A01D 84/00
(52) U.S. Cl. ........................................................ 56/192
(58) Field of Search .................... 56/366, 376, 372, 56/370, 377, 208, 192; 198/369.5

(56) References Cited

U.S. PATENT DOCUMENTS

| | | | | | |
|---|---|---|---|---|---|
| 2,385,829 | A | * | 10/1945 | Melroe | 198/693 |
| 2,400,667 | A | * | 5/1946 | Toews | 144/250.12 |
| 2,839,885 | A | * | 6/1958 | Eischens | 56/364 |
| 2,881,580 | A | * | 4/1959 | Ashton | 56/364 |
| 3,178,876 | A | * | 4/1965 | Lundberg | 56/372 |
| 3,206,920 | A | * | 9/1965 | Hofer | 56/364 |
| 3,362,480 | A | * | 1/1968 | Barber | 171/89 |
| 3,452,525 | A | * | 7/1969 | Francis | 56/327.1 |
| 3,664,645 | A | * | 5/1972 | Cobey | 241/101.72 |
| 3,733,033 | A | * | 5/1973 | Cobey | 241/30 |
| 3,858,814 | A | * | 1/1975 | Wagner, Jr. | 241/101.72 |
| 4,014,390 | A | * | 3/1977 | Teixeira | 171/124 |
| 4,202,159 | A | * | 5/1980 | Young | 56/364 |
| 4,300,337 | A | * | 11/1981 | Sharp | 56/376 |
| 4,396,292 | A | * | 8/1983 | Roman | 366/345 |
| 4,412,612 | A | * | 11/1983 | Ackerman | 198/697 |
| 4,739,610 | A | * | 4/1988 | Schultz | 56/364 |
| 4,932,196 | A | | 6/1990 | Schnittjer | |
| 4,965,993 | A | * | 10/1990 | Butler et al. | 56/327.1 |
| 4,976,095 | A | | 12/1990 | Schnittjer | |
| 5,641,058 | A | * | 6/1997 | Merten et al. | 198/810.04 |
| 5,893,262 | A | | 4/1999 | Harbach | |
| 5,964,081 | A | * | 10/1999 | Ingram | 56/14.5 |
| 6,173,559 | B1 | * | 1/2001 | Nevarez, Sr. | 56/16.5 |
| 6,516,941 | B1 | * | 2/2003 | Buhne | 198/813 |

* cited by examiner

Primary Examiner—Árpád Fábián Kovács
(74) Attorney, Agent, or Firm—McKee, Voorhees & Sease, P.L.C.

(57) ABSTRACT

A machine for turning material piled on the ground in a windrow comprises first and second track assemblies spaced apart from one another and having a lift assembly therebetween. The lift assembly lifts the material upwardly and deposits it to the rear. The first and second track assemblies are individually driven so as to eliminate bending forces on the intermediate lifting assembly. Extensible belt tensioners are provided for tensioning the belt, and these extensible belt tensioners are protected from the material being elevated and aerated. The method involves moving the belt assembly along a first pit containing the material to be composted and then reversing the belt assembly for returning in the opposite direction along an adjacent pit containing materials.

13 Claims, 7 Drawing Sheets

DUAL DRIVE MATERIAL TURNING MACHINE AND METHOD

BACKGROUND OF THE INVENTION

The present invention relates to a dual drive material turning machine and method. Composting requires that the material being composted be turned or aerated periodically in order to achieve the biodegradation necessary in order to change the material to compost. Therefore, a need has arisen for equipment for quickly and easily turning and aerating the material being composted.

Prior compost windrow turners are shown in U.S. Pat. Nos. 4,932,196; 4,976,095; and 5,893,262. These prior compost windrow turners utilize an elevated moving face for lifting the compost material upwardly and for depositing it to the rear of the device. They include a drive mechanism provided by a tractor or other vehicle at one side of the device.

One disadvantage of these prior devices is that unusual bending forces are applied to the elevated moving face during the time that the compost turning occurs. This is the result of the drive mechanism being placed at one side of the compost turner.

One of the patents, U.S. Pat. No. 4,976,095, shows a plurality of vanes 96 which are connected by a single rod so that they will always remain parallel to each other and can be moved simultaneously by movement of a single rod. Because all of these vanes are parallel to one another, it is not possible to change the shape or configuration of the pile of material being deposited at the rear of the device.

Also, in prior devices, sprockets are used at the lower end of the device for tightening the belt which is trained around an upper sprocket and a lower sprocket. Tightening devices have been provided which are positioned between the two upper and lower sprockets and also between the front and rear surfaces of the belt being driven. These tightening devices often encounter material being lifted by the belt assembly, and become dirty and exposed to these materials to the point where they sometimes become inoperative.

Therefore, a primary object of the present invention is the provision of an improved drive material turning machine and method for operating the same.

A further object of the present invention is the provision of an improved material turning machine which utilizes drive tracks on opposite sides of a belt assembly, with both of the drive tracks being driven to propel the machine through the material being aerated and turned.

A further object of the present invention is the provision of an improved dual drive material turning machine and method which minimizes the bending forces applied between the lifting apparatus and the drive train for the machine.

A further object of the present invention is the provision of an improved dual drive material turning machine and method which includes two sets of vanes that can be independently adjusted so as to change the shape and form of the windrow being deposited behind the turning machine.

A further object of the present invention is the provision of an improved tightening apparatus which is protected from the material being lifted by the machine.

A further object of the present invention is the provision of a method for moving the machine through an elongated pit containing the material to be turned and aerated.

A further object of the present invention is the provision of a method for guiding the machine along a pair of spaced apart channels during the time that the machine is being propelled through the elongated pit containing the material to be aerated.

A further object of the present invention is the provision of apparatus for suspending the machine from a pair of spaced apart rails and for lifting the machine to an elevated position above the material to be aerated and for lowering the machine into contact with the material to be aerated.

A further object of the present invention is the provision of a pair of elongated pits positioned in side-by-side relationship so that the machine may progress through one of the pits in a first direction and then reverse itself and progress through the second pit in a direction opposite from the first direction.

A further object of the present invention is the provision of a material turning machine which is economical to manufacture, durable in use and efficient in operation.

SUMMARY OF THE INVENTION

The foregoing objects may be achieved by an apparatus for turning material piled on the ground in a windrow. The apparatus comprises a first track assembly and a second track assembly spaced apart from one another and having continuous tracks, each having elongated track axes spaced apart from one another and approximately parallel to one another. A lift assembly is connected between the first and second tracks and comprises an upper end, a lower end, and a belt trained around the upper and lower ends. The lower end is positioned adjacent the ground and the upper end is positioned in spaced relation above the lower end whereby the belt includes a front belt surface extending upwardly from the lower end to the upper end and rear belt surface extending from the upper end to the lower end. A power source is connected to both of the first and second track assemblies for independently driving the first and second track assemblies. The power source is connected to at least one of the upper and lower ends for causing at least one end to rotate and cause the front face of the belt to move continuously from the lower end to the upper end and to cause the rear face of the belt to move continuously from the upper end to the lower end. In this motion, the belt will engage the material piled on the ground and then carry the material upwardly on the front surface of the belt and then drop the material back onto the ground as the belt passes over the upper end.

According to another feature of the invention, frame members are provided adjacent the upper end and have a first group and a second group of vanes mounted thereon in spaced relation to one another adjacent the upper end for engaging and guiding the material as the belt carries the material over the upper end and drops the material back onto the ground.

According to another feature of the present invention, each of the vanes in the first and second groups have a flat vane surface. The first and second groups of vanes each are independently adjustable to change the direction of the flat vane surfaces so as to direct and guide the material in the desired direction as it passes over the upper end of the lift assembly.

According to another feature of the present invention, the upper end includes at least one upper sprocket and the lower end includes at least one lower sprocket. The belt is trained around the upper and lower sprockets. A belt tightening apparatus extends between the upper and lower sprockets and is longitudinally extensible to expand the distance between the upper and lower sprockets and thereby tighten the belt trained around the upper and lower sprockets.

According to another feature of the present invention, the belt tightening apparatus comprises a hydraulic cylinder enclosed within a hydraulic cylinder protective housing so as to protect the hydraulic cylinder from coming in contact with the material.

The foregoing objects may be achieved by a method for turning a quantity of material resting on the ground. The method comprises moving a continuous belt around the upper end and the lower end so the belt moves along a front surface from the lower end to the upper end and then along a back surface from the upper end to the lower end. The method includes driving a first track connected to one side of the belt and a second track connected to the opposite side of the belt so as to move the belt towards the material resting on the ground. The material on the ground is engaged with the moving belt. It is carried upwardly on the front surface of the belt from the lower end to the upper end and is dropped to the ground as the material passes over the upper end.

According to another feature of the present invention, the material is engaged after it passes over the upper end of the belt assembly with a first group and a second group of spaced apart vanes. Each of the vanes has a vane surface and uses the vane surface to guide the material as it drops to the ground.

According to another feature of the present invention, the positions of the vanes are adjusted independently of one another so as to change the direction of guidance provided by the vane surfaces to the material as it drops to the ground.

According to another feature of the present invention, the quantity of material is contained within an elongated pit. The belt assembly is positioned within the first elongated pit so that it has a lower end engaging the material within the first elongated pit and an upper end above the lower end. A continuous belt is trained around the upper and lower ends. The belt is continuously moved so that it progresses from the lower end to the upper end on the front face of the belt and moves from the upper end to the lower end on a back face of the belt. The material is lifted on the front face of the belt assembly as the belt assembly moves from the lower end of the belt assembly to the upper end of the belt assembly. The material is deposited back in the first pit after the belt assembly has carried the material from the lower end of the belt assembly to the upper end.

According to another feature of the present invention, a second pit includes a quantity of material therein also. The method further comprises moving the belt assembly into the second pit after engaging and lifting all the material in the first pit. Then the material in the second pit is engaged with the lower end of the belt assembly and is lifted upwardly and deposited back into the second pit after the material has reached the upper end of the belt assembly.

According to another feature of the present invention, the first and second pits are positioned side-by-side and the method comprises moving the belt assembly in a first direction along the length of the first pit and moving the belt assembly in a second direction opposite from the first direction along the length of the second pit.

According to another feature of the present invention, the belt assembly is held completely above the material within the first pit and then the lower end of the belt assembly is moved downward into contact with the material within the first pit.

DETAILED DESCRIPTION OF THE PREFERRED EMBODIMENT

Figure 1:
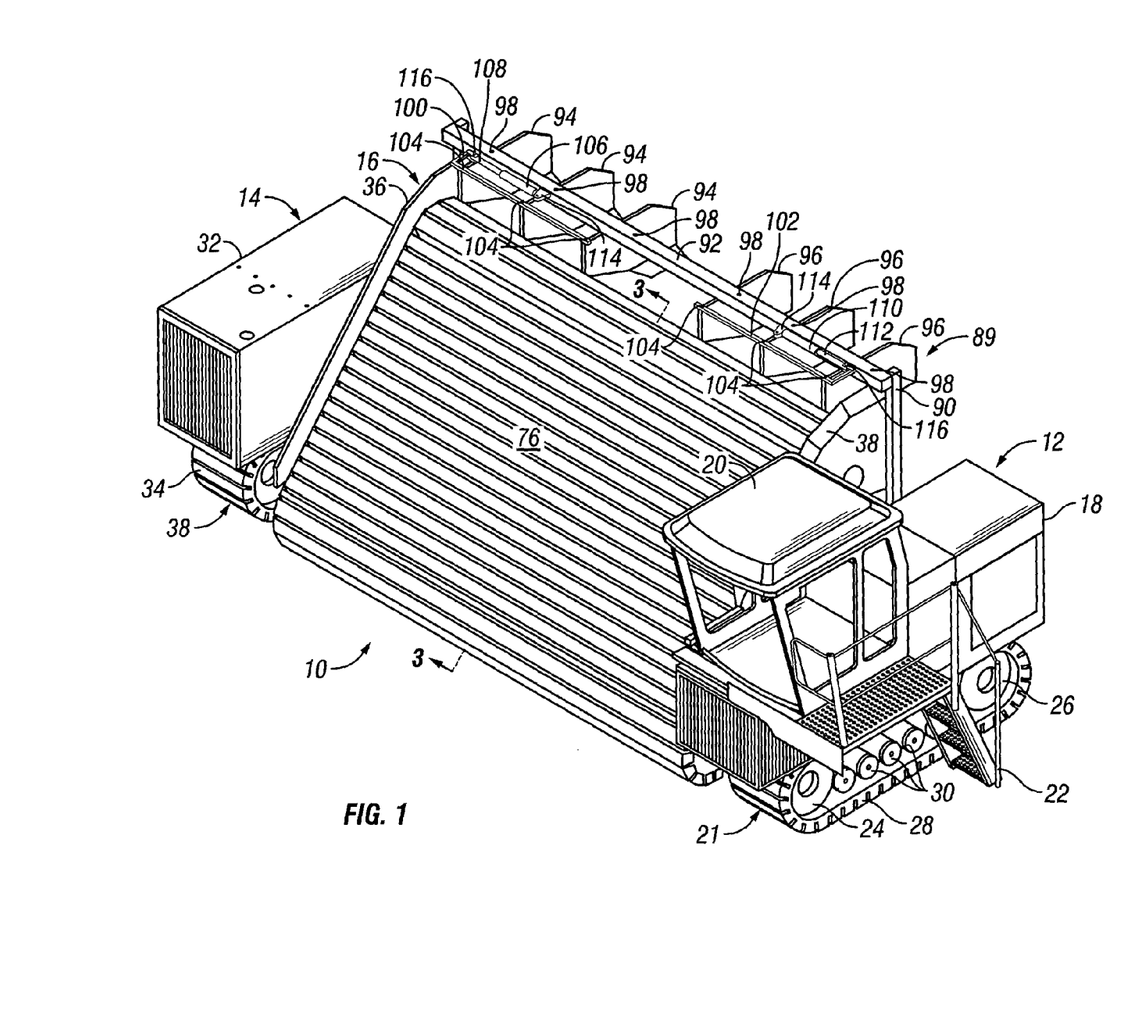
FIG. 1 is a perspective view of the dual drive material turning machine of the present invention.

Referring to FIG. 1, the numeral 10 generally represents one embodiment of the machine of the present invention. Machine 10 includes a first drive assembly 12 and a second drive assembly 14 which are positioned on the opposite sides of a lift or belt assembly 16. The first drive assembly 12 includes a first engine 18 and a cab 20. A stairway or ladder 22 leads to the cab 20. A first track assembly 21 includes a front wheel 24, a back wheel 26 and a first track 28 trained around the front and back wheels 24, 26. A plurality of idler wheels 30 are positioned between the front and back wheels 24, 26.

A second engine 32 includes a second track assembly 33 having a second track 34. Similar front, rear, and idler wheels (not shown) support the second track assembly 33.

Figure 4:
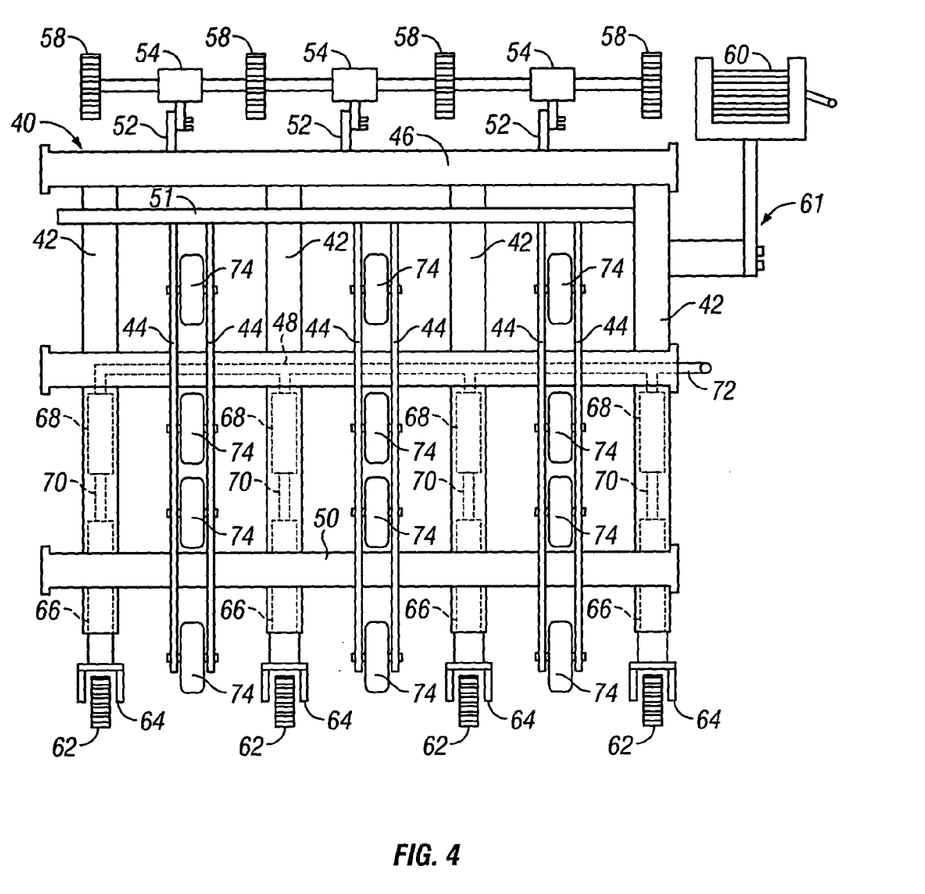
FIG. 4 is a sectional view taken along line 4—4 of FIG. 3.

The lift or belt assembly includes first and second side walls 36, 38. FIG. 4 shows the internal structure within the belt assembly 16.

An internal frame assembly 40 is comprised of four longitudinal frame tubes 42. The number of frame tubes may be varied without detracting from the invention. An upper cross frame 46, a middle cross frame 48 and a lower cross frame 50 extend transversely with respect to the longitudinal frame members 42. Also a cross strip member 51 extends transversely to the longitudinally members 42. Welded to the cross strip member 51 are a plurality of spaced apart wheel support strips 44 which extend parallel to the longitudinally extending frame members 42.

Extending upwardly from the upper cross frame 46 are a plurality of upper mounting ears 52 having upper bosses 54 mounted thereon. Extending through the upper bosses 54 is an elongated upper sprocket shaft which is rotatable within the bosses 54. A plurality of sprockets 58 are rigidly attached to the sprocket shaft 56 and are adapted to rotate in unison therewith. A hydraulic motor 60 is drivingly connected to the shaft 56 for rotating the sprockets 58. Motor 60 is supported by a motor support frame 61 that is rigidly connected to the internal frame assembly 40. The number of sprockets 58 may vary without detracting from the invention.

Figure 3:
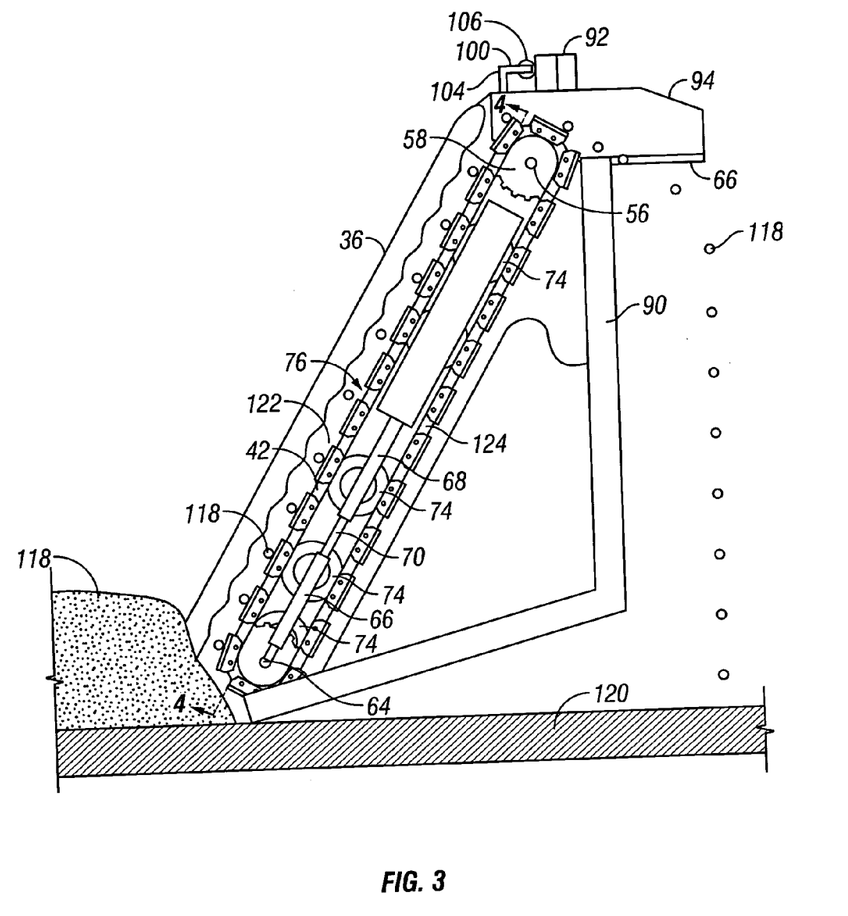
FIG. 3 is a sectional view taken along line 3—3 of FIG. 1.

At the lower end of internal frame assembly 40 are mounted a plurality of lower sprockets 62 which are rotatably mounted within sprocket mounts 64. Welded to each sprocket mount 64 is an extensible tube 66 which is telescopically received within the elongated longitudinally extending tubes 42. Also contained within each of the tubes 42 is a hydraulic cylinder 68 having a cylinder rod 70 extending therefrom. A hydraulic hose 72 extends within the middle cross frame 48 which is hollow, and provides hydraulic fluid to each of the hydraulic cylinders 68. It can be seen from FIGS. 3 and 4 of the drawings that the walls of tubes 42 protect the cylinder 68 and the cylinder shaft 70 as well as the hydraulic hose 72 from the material being conveyed by the belt 76. Support wheels 74 are mounted between the strips 44 and are rotatable so as to provide support to the upper surface 122 of the belt 76. Thus the belt 76 extends upwardly from lower sprocket 62 toward the upper sprocket 58. Then the belt returns in a downward path from the upper sprocket 58 along a rear face 124 of the belt 76 to the lower sprocket 62.

Figure 2:
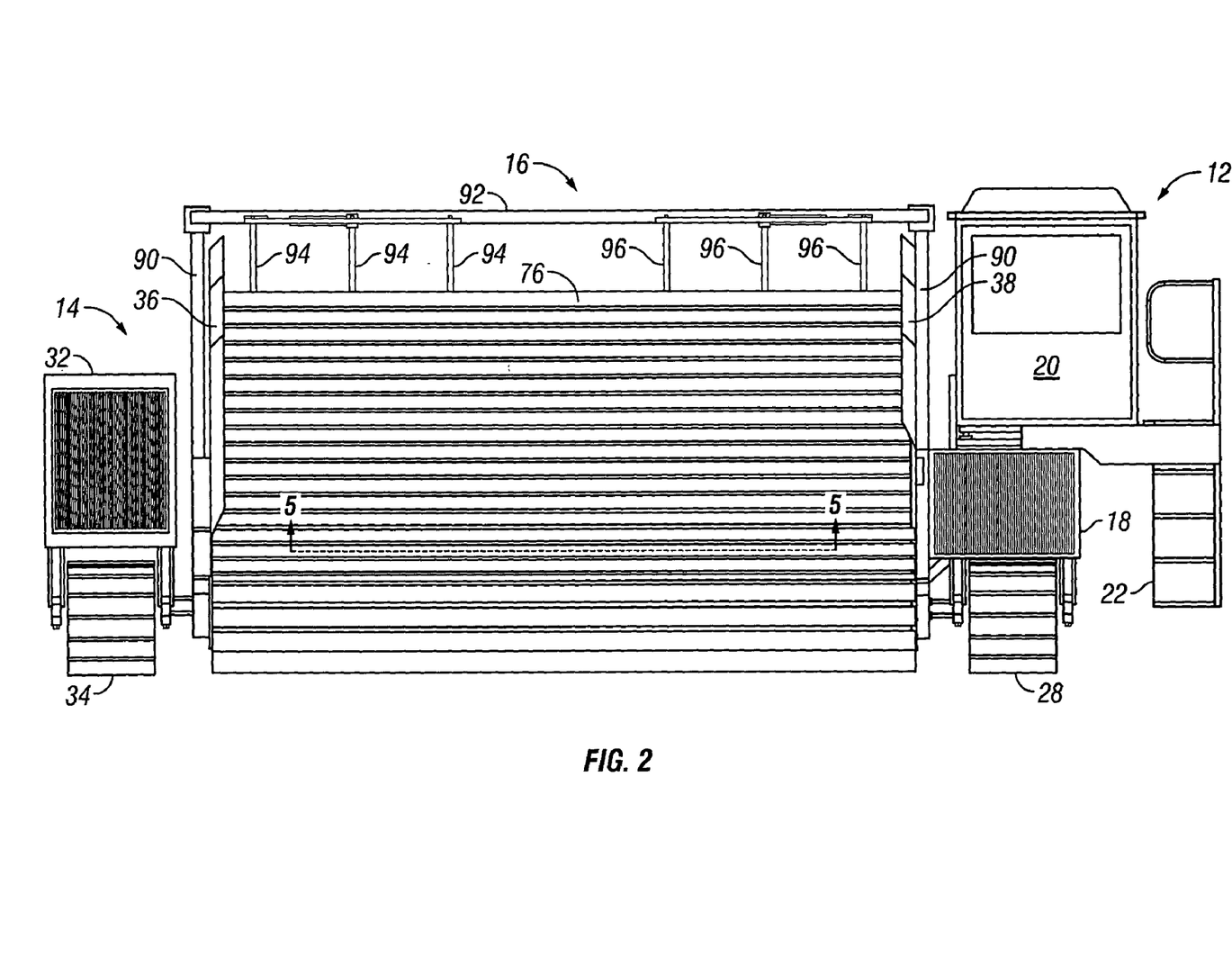
FIG. 2 is a front elevational view thereof.
Figure 5:
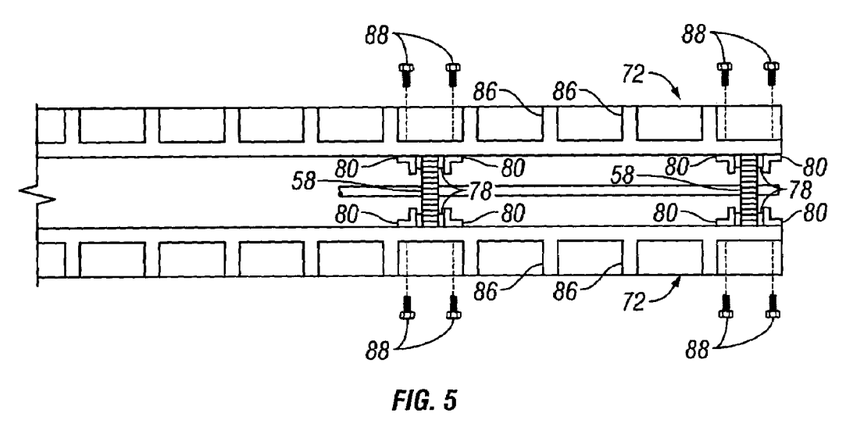
FIG. 5 is a sectional view taken along line 5—5 of FIG. 2.
Figure 6:
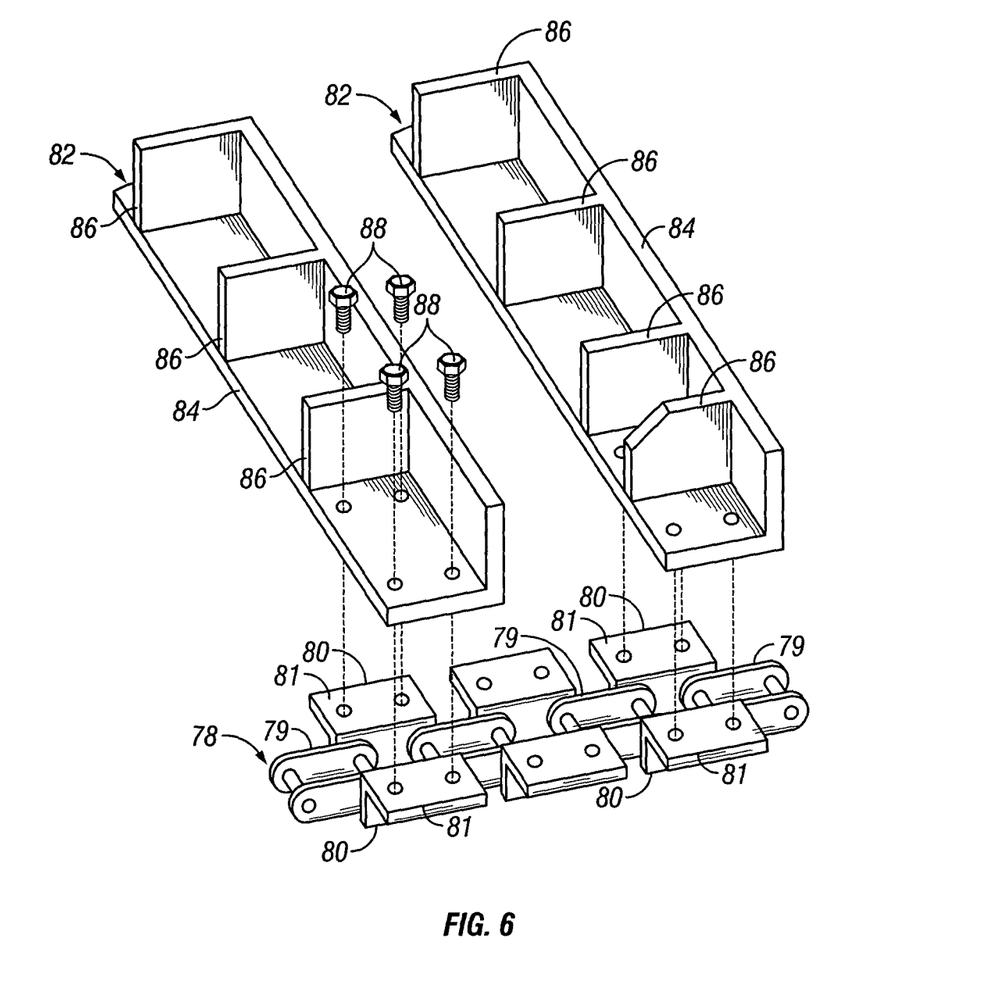
FIG. 6 is a partial perspective view showing the detail of the chains and the attached belt crossbars which comprise the belt.

The belt 76 is shown schematically in FIGS. 1 and 2, but its structure and the structure of the chains which guide the belt around the sprockets 58, 62 are shown in FIGS. 5 and 6. The chains 78 include chain links 79 which are interconnected by a plurality of mounting flanges 80. Each mounting flange 80 includes an upper horizontal surface 81 for receiving a plurality of cross bars 82. Each belt cross bar 82 is formed from an L-shaped angle 84 having a plurality of vertical portions 86. Together, the chains 78, the mounting flanges 80, and the belt cross bars 82 form the belt 76.

The bolts 88 bolt the belt cross bars 82 to the upper flat surfaces 81 of the mounting flanges 80. Thus each L-shaped angle 84 comprises and independent segment of the entire belt 76. It should be noted that the vertical flanges 86 of each angle 82 are positioned in alternating relationship so that the vertical flanges of one angle 82 are positioned between the vertical flanges 86 of the adjacent angle 82.

A vane assembly 89 is supported by a pair of spaced apart upstanding frame members 90. Extending between the upper ends of the frame members 90 is a vane cross tube 92. A first group of vanes 94 is mounted to the cross tube 92 and a second group of vanes 96 is also mounted to the cross tube 92. The two groups of vanes 94, 96 are pivotally mounted to the cross tube 92 for pivotal movement about vane axes 98.

A first vane tie link 100 is connected at the forward ends of vanes 94 and a second vane tie link 102 is connected at the forward ends of vanes 96. The connection between the first and second vane tie links 100, 102 and the two groups of vanes 94, 96 is accomplished by a plurality of tie pins 104 that protrude upwardly from the upper edges of the vanes 94, 96. A first hydraulic cylinder 106 includes a first cylinder rod 108, and a second hydraulic cylinder 110 includes a second cylinder rod 112. The cylinders 106, 108 are connected to the cross bar 92 by a pair of cylinder mounts or ears 114. The first and second rods 108, 112 are connected to the links 100, 102 respectively by means of devises 116. The first group of vanes 94 and the second group of vanes 96 are independently movable with respect to one another. Extension or retraction of the hydraulic cylinders 106, 110 cause movement of the vanes 94, 96 respectively. It is possible to turn the vanes 94 towards the center and the vanes 96 towards the center so as to create the desired configuration for a windrow of the material 118 being turned. It is also possible to keep them parallel to one another or to direct them outwardly as desired for the resulting configuration of the windrow formed by the material after it has been aerated. Other configurations such as slanting them all the same direction may be used.

Figure 7:
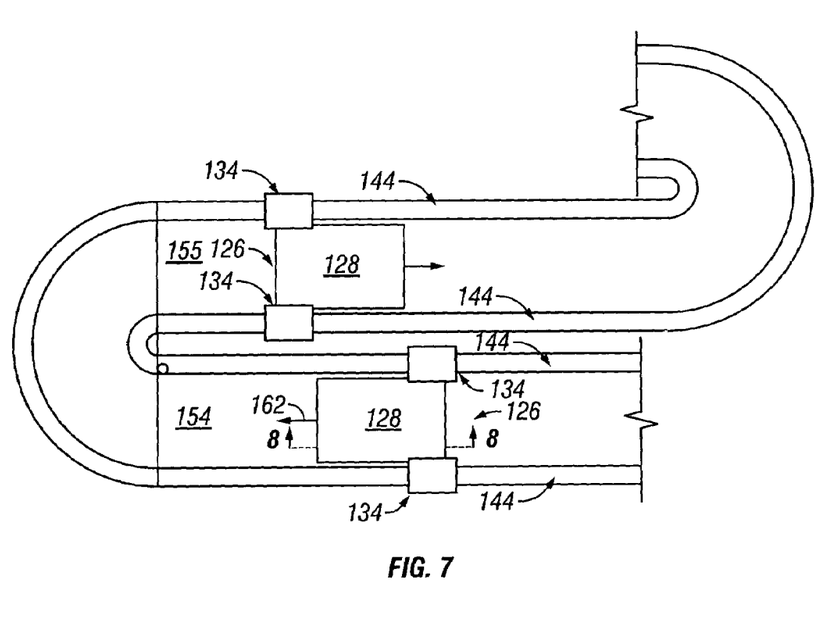
FIG. 7 is a top plan view of a pair of pits located in side-by-side relation.
Figure 8:
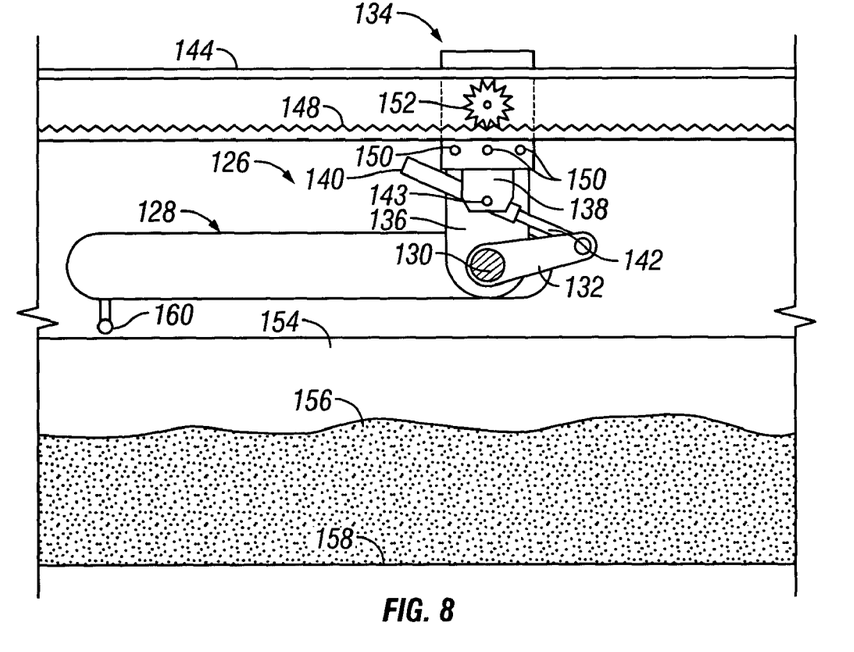
FIG. 8 is a sectional view taken along line 8—8 of FIG. 7.
Figure 9:
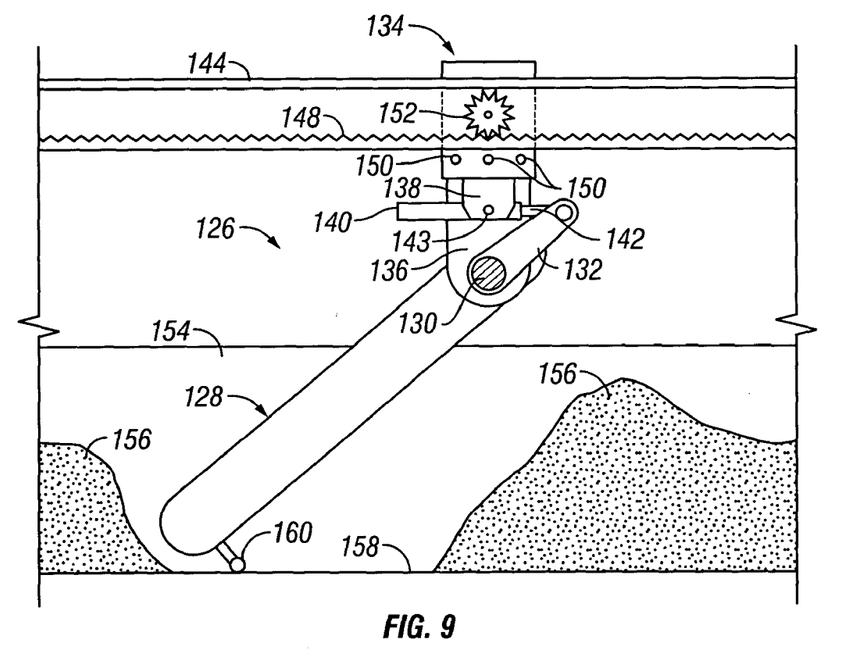
FIG. 9 is a view similar to FIG. 8, but showing the belt assembly in its lowered position.

Referring now to FIGS. 7–9, a modified form 126 of the machine is shown. The machine 126 includes a belt assembly 28 which is substantially the same as the belt assembly described for FIGS. 1–6. However, the belt assembly 128 includes an upper shaft 130 which is rigidly mounted thereto and which includes crank arms 132 rigidly connected to its opposite ends. A crane head 134 includes a pair of spaced apart downwardly extending belt flanges 136 which rotatably support the upper shaft 30. Also extending downwardly from crane head 134 are a pair of spaced apart cylinder flanges 138 between which a cylinder 140 is mounted. Cylinder 140 includes a rod 142 which is connected to the end of crank arm 132. Cylinder 140 is rotatably mounted between the cylinder flanges 138 for pivotal movement about the axis 143.

The crane head 134 is mounted for movement along a crane channel 144 which has channel teeth 148 adjacent its lower end. A plurality of idler rollers 150 are positioned below the channel teeth 148 and a drive gear 152 is positioned above and in engagement with the channel teeth 148. The drive gear 152 is driven by a hydraulic motor (not shown) which causes movement of the crane head 134 along the length of crane channel 144.

An elongated first pit 154 is shown in FIG. 7 to be positioned adjacent a second elongated pit 155. As can be seen in FIG. 7, the tracks 144 extend on opposite sides of the pit 154 and then turn back and extend along the opposite sides of second pit 155. Within the pits 154, 155 are materials 156 to be composted. These materials require turning, and they rest upon the pit bottom or floor 158.

FIG. 8 illustrates the belt assembly in its elevated position with the rod 142 extended from the hydraulic cylinder 140. FIG. 9 illustrates the belt assembly 128 in its lowered position. It should be noted that bottom roller 160 is mounted on the bottom end of belt assembly 128 and is adapted to roll along the surface or bottom of 158 of pit 154.

The belt assembly 128 is initially in its elevated position shown in FIG. 8. The cylinder 140 is retracted and the belt assembly 128 moves to its lowered position shown in FIG. 9. At the same time the belt within the belt assembly is actuated to rotate and the material is lifted upwardly on the belt and dropped from the upper end of the belt downwardly back into the pit. The crane head 134 moves slowly in the direction shown by arrow 162 in the first pit 154. When the left end of the pit 154 is reached, the belt assembly 128 is again elevated to its upper position and the belt is moved around and reversed in direction so that it fits within the second pit 155 moving from left to right as viewed in FIG. 7. The belt assembly 128 is then lowered and the crane head 134 continues to move the belt assembly 128 to the right through the material being composted. FIG. 7 shows the tracks turning towards yet a third pit (not shown). But the tracks may be arranged in a variety of configurations. For example, they could be a loop that turns back to the first pit 154 after completion of the turning of compost in the second pit 155. Other methods and means may be used for mounting the belt assembly and for passing it through the pits containing the material to be composted.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. Apparatus for turning material piled on the ground in a windrow comprising:

a first track assembly and a second track assembly spaced apart from one another and having continuous tracks, each having elongated track axes spaced apart from one another and approximately parallel to one another, the track assemblies engaging the ground and being adapted to move in a forward direction on the ground toward the material piled on the ground;

a lift assembly connected between the first and second track assemblies and comprising an upper end, a lower end, and a belt trained around the upper and lower ends;

the lower end being positioned adjacent the ground and the upper end being positioned in spaced relation above, and rearwardly of the lower end whereby the belt includes an upwardly presented front belt surface extending upwardly from the lower end to the upper end, and a downwardly presented rear belt surface extending from the upper end to the lower end;

a power source connected to both of the first and second track assemblies for independently driving the first and second track assemblies;

the power source being connected to at least one of the upper and lower ends for causing the at least one end to rotate and cause the front surface of the belt to move continuously from the lower end toward the upper end and to cause the rear surface of the belt to move continuously from the upper end toward the lower end, whereby the belt will engage the material piled on the ground and carry the material upwardly on the front surface of the belt and then drop the material back onto the ground as the belt passes over the upper end.

2. The apparatus of claim 1 and further comprising a frame member adjacent the upper end of the lift assembly, the frame member being stationary with respect to the movement of the belt of the lift assembly, and having a first group and a second group of vanes mounted thereon in spaced relation to one another adjacent the upper end for engaging and guiding the material as the belt carries the material over the upper end and drops the material back onto the ground.

3. The apparatus of claim 2 wherein each of the vanes in the first and second groups of vanes have a flat vane surface, the first and second groups of vanes each being independently adjustable to change independently the direction of the flat vane surfaces of the first and second groups of vanes so as to direct and guide the material in first and second different directions as the material passes over the upper end of the lift assembly.

4. The apparatus of claim 1 wherein the upper end includes at least one upper sprocket and the lower end includes at least one lower sprocket, the belt being trained around the upper and lower sprockets, a belt tightening apparatus extending between the upper and lower sprockets and being longitudinally extensible to expand the distance between the upper and lower sprockets and thereby tighten the belt trained around the upper and lower sprockets.

5. The apparatus of claim 4 wherein the belt tightening apparatus comprises a hydraulic cylinder enclosed within a hydraulic cylinder protective housing so as to protect the hydraulic cylinder from coming in contact with the material.

6. In combination:

a windrow of material lying on the ground, the windrow having a width, height, and a length;

a first track assembly and a second track assembly spaced apart from one another and straddling the windrow, the first and second track assemblies each having a continuous track, engaging the ground for moving the track assemblies in a forward direction;

a lift assembly movably connected to both the first and second tracks and comprising an upper end, a lower end, and a belt trained around the upper and lower ends;

the lower end being positioned adjacent the ground and forwardly of the upper end for engaging the windrow before the upper end, the upper end being positioned in spaced relation above and rearwardly from the lower end whereby the belt includes a front surface presented upwardly and extending upwardly from the lower end to the upper end, and a rear belt surface presented downwardly and extending from the upper end to the lower end;

the belt being in contact with the material lying on the ground;

a power source connected to both of the first and second track assemblies for independently driving the first and second track assemblies to move the track assemblies in a forward direction on the ground toward the windrow of material;

the power source being connected to at least one of the upper and lower ends for causing the at least one end to rotate and cause the front face of the belt to move continuously from the lower end toward the upper end and to cause the rear face of the belt to move continuously from the upper end toward the lower end, whereby the belt will engage the material piled on the ground and carry the material upwardly on the front surface of the belt and then drop the material back onto the ground as the belt passes over the upper end.

7. The apparatus of claim 6 and further comprising a frame member that is stationary with respect to the belt, the frame member being adjacent the upper end and having a plurality of vanes mounted thereon in spaced relation to one another adjacent the upper end for engaging and guiding the material as the belt carries the material over the upper end and drops the material back onto the ground.

8. The apparatus of claim 7 wherein the plurality of vanes each have a flat vane surface, the plurality of vanes including first and second groups of vanes that are independently adjustable to change the direction of the flat vane surfaces so as to direct and guide the material in first and second directions respectively.

9. The apparatus of claim 6 wherein the upper end includes at least one upper sprocket and the lower end includes at least one lower sprocket, the belt being trained around the upper and lower sprockets, a belt tightening apparatus extending between the upper and lower sprockets and being longitudinally extensible to expand the distance between the upper and lower sprockets and thereby tighten the belt trained around the upper and lower sprockets.

10. The apparatus of claim 9 wherein the belt tightening apparatus comprises a hydraulic cylinder enclosed within a hydraulic cylinder protective housing so as to protect the hydraulic cylinder from coming in contact with the material.

11. A method for turning material piled on the ground in a windrow; the method comprising:

taking an apparatus comprising a first track assembly and a second track assembly spaced apart from one another and each having a continuous track trained around spaced apart forward and rear wheels, the track assemblies engaging the ground and being adapted to move in a forward direction on the ground toward the material piled on the ground; the apparatus further comprising a lift assembly positioned between and connected to both the first and second track assemblies and comprising an upper end, a lower end, and a belt trained around the upper and lower ends, the lower end being positioned adjacent the ground and the upper end being positioned in spaced relation above and rearwardly of the lower end whereby the belt includes an upwardly presented front belt surface extending upwardly from the lower end to the upper end, and a downwardly presented rear belt surface extending from the upper end to the lower end;

powering the first and second track assemblies independently of one another so as to steer the apparatus in a forward direction toward the windrow;

moving the upwardly presented front belt surface from the lower end of tie lift assembly to the upper end of the lift assembly and the downwardly present rear belt surface from the upper end of the lift assembly to the lower end of the lift assembly;

steering the first and second track assemblies so that they straddle the windrow and the lower end of the lift assembly engages the windrow and causes the material in the windrow to be carried by the upwardly presented front belt surface to the upper and of the lift assembly;

dropping the material of the windrow from the top end of the lift assembly back onto the ground.

12. The method according to claim 11 and further comprising using a first group of vanes to deflect a first portion of the material being dropped from the top lift assembly in a first direction and using a second group of vanes to deflect a second portion of the material being dropped from the top end of the lift assembly in a second direction.

13. The method according to claim 11 and wherein the belt is trained around first and second rotating members, a tube assembly having a first tube member connected to the first rotating member and being telescopically mounted with respect to a second tube member connected to the second rotating member, the method further comprising using a longitudinally extensible piston and cylinder located inside the first and second tube members to cause the first tube member to telescope and expand longitudinally with respect to the second tube member so as to increase the tension of the belt trained around the first and second rotating members.

* * * * *

UNITED STATES PATENT AND TRADEMARK OFFICE
CERTIFICATE OF CORRECTION

PATENT NO.    : 6,931,826 B1
DATED         : August 23, 2005
INVENTOR(S)   : Schromen et al.

It is certified that error appears in the above-identified patent and that said Letters Patent is hereby corrected as shown below:

<u>Column 9,</u>
Line 9, should read -- lower end of lift assembly to the upper end of the lift --.
Line 17, should read -- front belt surface to the upper end of the lift assembly; --.

Signed and Sealed this

Eighth Day of November, 2005

JON W. DUDAS
*Director of the United States Patent and Trademark Office*